United States Patent [19]

Mocker

[11] Patent Number: 4,707,835
[45] Date of Patent: Nov. 17, 1987

[54] RAPID WAVELENGTH SWITCHING OF IR LASERS WITH BRAGG CELLS

[75] Inventor: Hans W. Mocker, Minneapolis, Minn.

[73] Assignee: Honeywell Inc., Minneapolis, Minn.

[21] Appl. No.: 875,113

[22] Filed: Jun. 17, 1986

[51] Int. Cl.[4] ............................................. H01S 3/10
[52] U.S. Cl. ..................................... 372/20; 372/99; 372/28; 372/13
[58] Field of Search ....................... 372/20, 13, 26, 28, 372/99

[56] References Cited

U.S. PATENT DOCUMENTS

| | | | |
|---|---|---|---|
| 3,614,462 | 10/1971 | Lean | 372/97 |
| 3,790,898 | 2/1974 | Gudmundsen et al. | 378/102 |
| 4,586,184 | 4/1986 | Hess | 378/13 |

Primary Examiner—Leon Scott, Jr.
Attorney, Agent, or Firm—John G. Shudy, Jr.

[57] ABSTRACT

Apparatus is provided for rapidly switching among discrete wavelengths within the output spectrum of a gas laser. A portion of the radiation in a primary optical cavity of a laser is transmitted by a partially reflective surface into a secondary cavity which includes a reflector element and one or more Bragg deflector cells. The Bragg cells are positioned between the primary cavity and reflector element, and frequency shift radiation passing between the primary cavity and reflector element. Each Bragg cell is selectably driven by an RF driver to enhance radiation of a predetermined wavelength within the range of the laser spectrum. Consequently, radiation injected back into the primary cavity from the secondary cavity is essentially of the predetermined wavelength.

11 Claims, 3 Drawing Figures

RAPID WAVELENGTH SWITCHING OF IR LASERS WITH BRAGG CELLS

BACKGROUND OF THE INVENTION

The present invention relates generally to a detector or sensing system, and more particularly to such a system which provides for rapid and efficient switching of the output spectrum of a molecular laser preferably arranged in a dual or tandem optical cavity configuration and utilizing a $CO_2$ laser, a CO laser, or the like. In order to achieve the rapid wavelength switching available in the operation of this system, a Bragg cell is utilized in a secondary or tandem configuration with the main cavity of the system. The arrangement of the present invention provides for relatively low coupling losses, as well as rapid switching speeds, with switching times of the order of 1 to 10 microseconds being achieved.

In the present arrangement, a Bragg cell is disposed in a secondary cavity which is arranged in tandem to the main laser cavity. The arrangements proposed can be linear or ring laser configurations. The arrangements in a ring configuration preferably consist of a three-mirror resonator in the main laser cavity with a modified form of ring resonator preferably being utilized in the secondary or wavelength controlling feedback cavity. The components in the feedback cavity include one or more acousto-optic modulators operated in the Bragg cell mode, together with a reflector element, the reflector element normally being a mirror or a grating operated in the Littrow mode. One reflector element of the feedback cavity is mounted to a piezoelectric element with the arrangement providing on-resonance tuning of the secondary or wavelength controlling feedback cavity for the case of the ring laser and off-resonance tuning for the linear coupled cavities.

In the past, various attempts have been made to provide for rapid switching of lasers. For example, a number of prior U.S. patents provide examples of utilizing tunable lasers with Littrow gratings. For example, in U.S. Pat. No. 3,443,243 to Patel, a grating is located beyond the reflective elements defining the optical resonator cavity of a laser and light reflected from the grating passes through an aperture to maximize frequency resolution. The concave reflective grating employed in Patels' device can be rotated about an axis parallel to the grating lines. In U.S. Pat. No. 3,739,295 to Shah, a rotatable plane reflective grating is employed as a tuning element in a dye laser. An aperture is included between the grating and one of the resonator cavity reflector elements to block fluorescence of radiation returning from the grating to the lasing medium. In a patent to Comera et al, U.S. Pat. No. 4,241,318, a laser's plane reflector grating is adapted, in combination with a wheel containing two optical elements, to place the optical elements periodically in the path of the laser beam. This deflects the laser beam so that the angle of incidence of the beam on the grating is modified and a different wavelength is reflected back along the longitudinal axis of the laser for each element. The grating and wheel are rotatable as a unit relative to a plane perpendicular to the longitudinal axis of the laser so that more than two wavelengths can be selected.

U.S. Pat. No. 4,028,636 to Hughes granted June 7, 1977 shows an acousto-optic tuning system for an organic dye laser, the tuning element comprising a diffraction grating 20 and a Bragg diffraction cell driven by an RF responsive, ultrasonic transducer, all within the primary optical cavity. In U.S. Pat. No. 4,216,440 to Rahn et al granted Aug. 5, 1980, surface acoustic waves in the sides of a piezoelectric prism 13 provide two reflective diffraction gratings for tuning the resonant cavity of a laser 11.

An embodiment shown in FIG. 9 of U.S. Pat. No. 4,287,486 to Javan discloses a double grating arrangement with the gratings facing each other, albeit offset and not parallel, so different wavelengths of light from the laser are dispersed onto a mirror. The mirror is rotated to sequentially regenerate only one of a series of wavelengths at a time. The laser is triggered to fire when light of the first wavelength strikes the mirror in perpendiculr relationship, with the pulse continuing until all the wavelengths of interest are scanned. Thus a chirped pulse (i.e. a pulse with a change in wavelength within the pulse) is provided. Javan however, does not disclose a pulsed laser wherein each pulse can be tuned to a different wavelength, particularly if very fast switching times are desired.

In "$CO_2$ Probe Laser with Rapid Wavelength Switching", S. Holly and S. Aiken, SPIE Volume 122, Advances in Laser Engineering (1977), rapid tuning of a continuous wave $CO_2$ probe laser is provided by positioning eight gratings in carousel fashion about a mirror mounted on a scanner driven by a stepping motor. The eight gratings are switched in sequence into the optical cavity of the probe laser. Switching between wavelengths was reported to occur within approximately 10 milliseconds. The number of wavelengths which can be scanned by the Holly and Aiken device is limited by the number of gratings provided and the alignment problems require a complex electro optics control loop system.

Due to the many levels of the rotation-vibration band of $CO_2$ between 80 to 100 lines of $CO_2$-laser transitions can be brought into oscillation. Cavities of relatively short length, such as in the range of approximately 6 inches, typically bring a substantial number of wavelengths or lines into oscillation, such as from 10 to 12 different wavelengths. On the other hand, cavity lengths of from between 2 feet and 3 feet may only bring one wavelength into oscillation.

In $CO_2$ laser structures of relatively long cavity length, the predominant output frequency is a wavelength of 10.591 microns, with this wavelength being known as the P(20) line. If, for a system employing such a laser, oscillation at wavelengths other than the P(20) line is desired, means are normally provided in the system to provide a selectable wavelength for the system output. The arrangement of the present invention provides for off-resonance tuning in the auxiliary cavity of the coupled cavity configuration, thus achieving its goal of rapid wavelength switching in the main cavity at comparatively low power levels in the auxiliary cavity.

By way of contrast with the prior art, the present invention provides a relatively simple but highly efficient system which has been developed for providing an output which rapidly scans a number of wavelengths which are derived from a single laser source, with the wavelength scanning occurring at a rapid rate, such as rates on the order of from 1 to 10 microseconds. It has been found that such a system would be particularly useful in spectrographic analyses, such as for use in combination with diagnostic laboratory instruments, remote sensing systems for detection and determination of certain toxic gases or the measurement of air-borne pollutants, and also in military laser systems where immunity against counter-measures is important.

SUMMARY OF THE INVENTION

The present invention is directed to a laser system having first (main) and second tandem-arranged optical cavities, with the second cavity being arranged to control as well as to minimize the circulating power in the tandem cavity through off-resonant tuning. Operation is achieved through utilization of a tandem cavity wherein a cavity mirror is mounted on the surface of a piezoelectric device so as to obtain operation in off-resonance of the secondary cavity with respect to the first cavity. This second optical cavity is normally arranged in combination with a conventional Bragg cell which utilizes acousto-optic interaction so as to provide a control for the laser wavelength. In this connection, the wavlength of the laser output may be controlled and switching from one wavelength to the other is simply accomplished by changing the drive frequency of the Bragg cell.

As indicated, the system utilizes two coupled optical cavities, with the primary cavity including a gain-tube which is preferably interposed therealong. In the preferred embodiment, the gain-tube is provided in one leg of a unidirectional ring laser. The second or tandem cavity is provided with an acousto-optical means for varying the frequency of the energy within the second optical cavity, and with means being provided to re-inject the signal frequency into the main or primary optical cavity. Since the main ring laser cavity is operating unidirectionally, the secondary ring cavity should be operating onresonance for maximum efficiency.

The present arrangement provides advantages over the known use of a Bragg cell in an intra-cavity arrangement, inasmuch as Bragg cells are considered to be simply too inefficient (lossy) for normal use in such an application. In the present arrangement, by way of contrast, the Bragg cell is only utilized in the secondary cavity arranged in tandem with the main cavity.

Therefore, it is a primary object of the present invention to provide an improved wavelength shifting apparatus for lasers, and particularly for rapid wavelength shifting of lasers operating in the infrared range.

It is a further object of the present invention to provide an improved wavelength switching arrangement for infrared lasers, and wherein coupled optical cavities are provided, with the main cavity including a conventional laser excitation and gain-tube, and with the secondary cavity providing a signal operating at a controllable signal for switching the wavelength of the energy being created and/or stored in the main cavity.

Other and further objects of the present invention will become apparent to those skilled in the art upon a study of the following specification, appended claims, and accompanying drawings.

IN THE DRAWINGS

DESCRIPTION OF THE PREFERRED EMBODIMENTS

Figure 1:
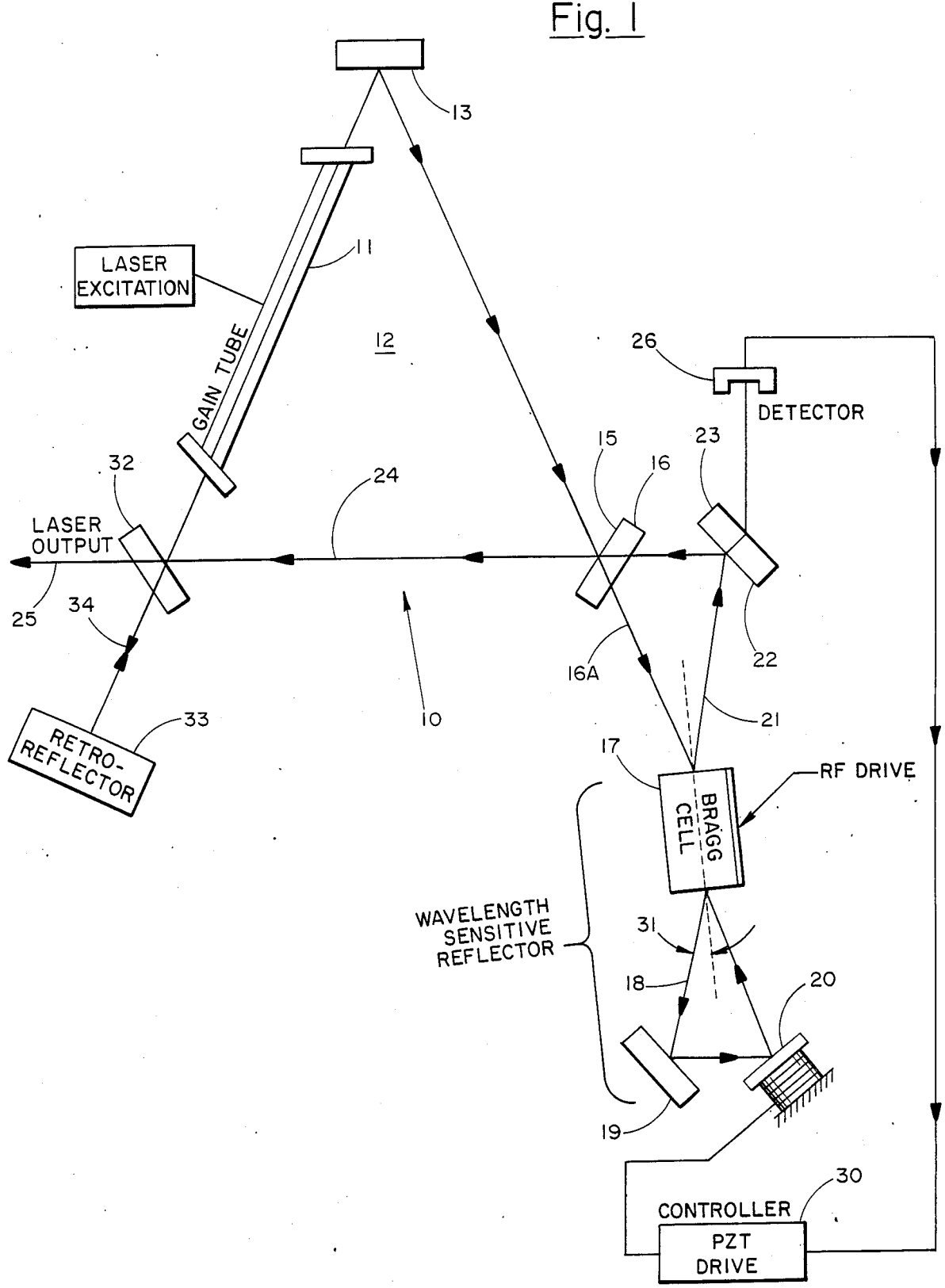
FIG. 1 is a schematic representation of a preferred form of the present invention.

The dual laser cavity arrangement utilizing a Bragg cell in the secondary cavity, while shown in each of the illustrated embodiments, is shown in the configuration generally designated 10 in FIG. 1. In the arrangement of FIG. 1, laser excitation is obtained in plasma tube 11, which may be defined as a gain-tube, and provides gain in the ring resonator consisting of the mirrors 32, 16, and 13. Totally reflective mirror surface 33 functions to make the laser unidirectional, to oscillate in the clockwise direction only. A portion of this energy or radiation is coupled out of the ring-resonator by means of the partially reflective surface 15 of partially reflective-partially transmissive mirror 16. The transmitted wave energy is directed along transmission axis 16A to Bragg cell 17 driven by a RF driver at a frequency preferably between 50 and 100 MHz. A portion of the signal is single-side-band modulated and upshifted in frequency with the deflected condition, as shown at 18. The signal is reflected by mirrors 19 and 20 to re-enter the Bragg cell, where the energy is downshifted in frequency. Accordingly, frequency of the signal leaving the Bragg cell becomes coincident with the unshifted signal having a base band frequency $V_O$. Such energy leaves Bragg cell along line 21, and onto the partially reflective surface 22 of mirror 23. This signal, at a selected frequency, is then injected into the ring laser and provides the wavelength-selective injection signal to the system. For any given drive frequency of Bragg cell 17, a specific laser output wavelength between 9 and 11 micrometers will have feedback into the ring laser along the line as shown at 24 and will thus provide the frequency condition of oscillation in the main ring laser.

Essentially, the energy moving through the ring-resonator in a clockwise direction is treated so that a small portion thereof is permitted to pass outside of the main cavity, where its frequency is single-side-band modulated in a secondary cavity.

Bragg cell 17 may be powered with a germanium crystal, and is capable of selectively downshifting the frequency by an amount equal to, for example, 38 MHz. According to the Bragg equation the deflection angle will be proportional to frequency.

While the geometry of the individual systems will determine the angular arrangements desired, the half-angle shown at 31 may be in the range of approximately 77 milliradians.

For additional conservation of energy within the ring-resonator, that amount of energy passing in the counterclockwise direction from plasma tube 11 to partially reflecting mirror 32 becomes incident to retro-reflector 33, which is a total reflecting surface. Such energy is delivered back into the system as shown by the double-arrow designated 34, thereby re-entering the system for resonant propagation in the clockwise direction.

For a ring resonator we require the injected signal to be in phase with the unidirectional wave circulating in the ring laser. This can be achieved by a feedback loop consisting of detector 26 which adjusts the phase of the injection signal to be measured by means of a piezoelectric controller 30 and mirror 20.

Figure 2:
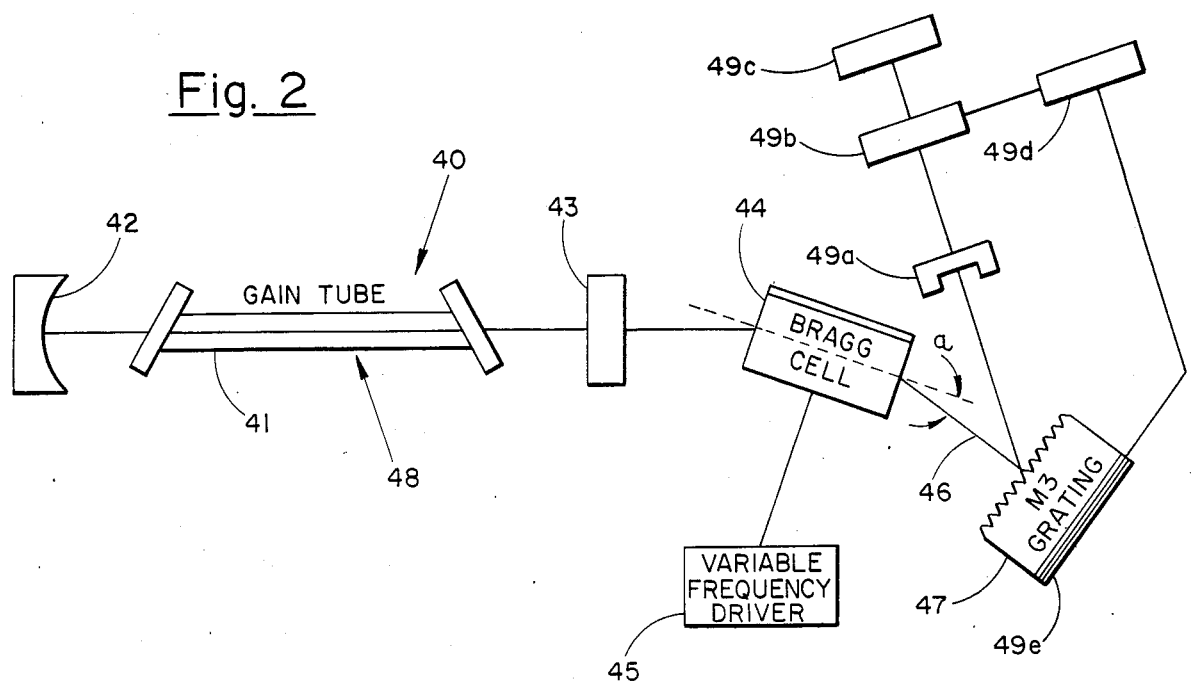
FIG. 2 is a schematic illustration showing one alternative configuration or technique for carrying out the certain aspects of the present invention.

Attention is now directed to FIG. 2 of the drawings wherein a modified form of the system is illustrated. In FIG. 2, the system generally deisgnated 40 includes a gain-tube 41 disposed between totally reflective mirror surface 42 and partially reflective mirror surface 43. That portion of the energy transmitted by mirror 43 is received within Bragg cell 44, driven by RF driver 45 at a frequency of between about 50 and 100 MHz. The Bragg cell 44 functions similarly to Bragg cell 17, thereby providing a downshift of transmitted energy delivered along path 46 onto grating 47. The angular arrangement of Bragg cell 44 with respect to the grating 47 is such that this angle will allow Bragg cell 44 to sweep the beam over the grating to obtain maximum reflectivity for the specific lines of interest. Wavelength selection for injection into primary cavity generally designated 48 is determined by varying the drive frequency of Bragg cell 44. Grating 47 is utilized in the Littrow mode. In providing the input for driver 45, one may utilize a variable frequency oscillator, or alternatively a bank of fixed frequency oscillators which are switched into operation of the Bragg cell by a suitable switching network. The line-to-line switching time may be determined electronically by the high frequency switching capability of the Bragg cell driver.

Off-resonance tuning apparatus 49 includes a detector 49a for detecting the $0^{th}$-order reflection from grating 47, and a comparator 49b that generates an output based upon the signal from detector 49a and a reference signal from a reference source 49c. The comparator output is fed to a controller 49d, the output of which is directed to a piezoelectric element 49e that determines the position of grating 47.

Figure 3:
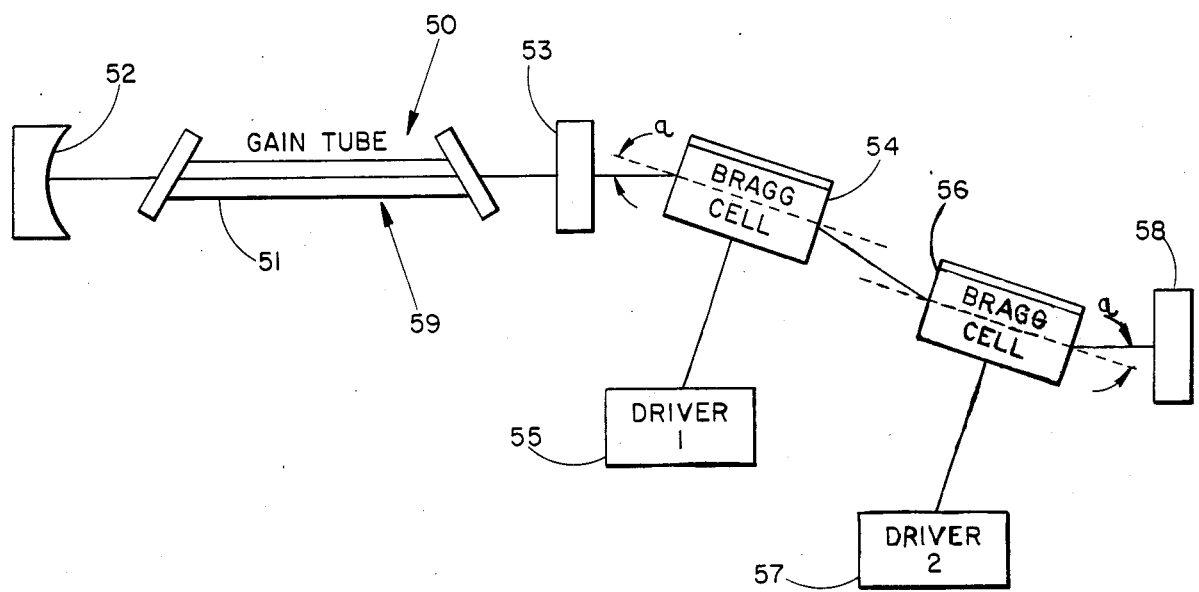
FIG. 3 is a schematic representation of a second alternative configuration or embodiment for carrying out certain aspects of the present invention.

The condition of off-resonance tuning in FIGS. 2 and 3 can be fulfilled by using the $0^{th}$-order reflection from grating 47 and comparing the intensity against a set reference intensity corresponding to a fixed off-resonance frequency from the main laser cavity. A feedback loop is closed on piezoelectric element 49e that controls the grating reflector position. In this way the tandem cavity is at all times set-off by a fixed amount from the resonance frequency of the main laser cavity. This loop must be activated after every wavelength switch of the Bragg cell driver.

In utilizing this single Bragg cell, the back-reflected coupling intensity is then upshifted by a factor of two times the acousto-optic drive frequency. For large deflection angles and lasers with small homogeneous line width, such as obtained with low pressure $CO_2$ lasers, the frequency shift may bring the injection signal to a range outside the gain-bandwidth of gain-tube 41, thus reducing the effectiveness of the system. However, by utilizing two Bragg cells in series, the radiation may be upshifted in the first Bragg cell and downshifted in the other, leaving the injected signal frequency unshifted.

Such an arrangement is illustrated in FIG. 3 wherein two Bragg cells are utilized in the secondary or tandem cavity with a normal reflector. Specifically, the system generally designated 50 includes gaintube 51 having a primary cavity defined by totally reflective mirror 52 and partially transparent mirror 53. That energy passing through mirror 53 enters first Bragg cell 54 driven by a driver 1 designated 55, where it is upshifted for passage into second Bragg cell 56 driven by driver 57. Output of Bragg cell 56, having been downshifted, is received by totally reflective mirror 58, where it is re-directed through the two Bragg cells 54 and 56. After reflection on mirror 58, the radiation is then upshifted in cell 56, and downshifted in cell 54 for providing the high feedback signal into the main laser cavity shown generally at 59. For each applied frequency to the Bragg cells, only one wavelength will provide such feedback signal into the main cavity 59, with only one line then being provided for oscillation in the main cavity. The arrangement in FIG. 3, while providing the advantage of operation without grating, nevertheless will function with a somewhat lower efficiency.

I claim:

1. Apparatus for rapid switching among discrete wavelengths within the output spectrum of a gas laser, including:
    a primary optical cavity including a gain tube for emitting radiation having a range of wavelengths, means defining a first surface for reflecting said radiation, and means defining a second surface for partially reflecting and partially transmitting said radiation; said first and second surfaces positioned with respect to said gain tube to form said primary optical cavity and to reflect the radiation essentially along a first path within said primary cavity;
    means defining a third surface for reflecting the radiation and positioned to reflect a portion of the radiation, transmitted beyond said primary cavity through said second surface, back towards said second surface essentially in a second path within a secondary optical cavity formed by said second and third surfaces and in tandem with the primary cavity, whereby at least some of the portion of the radiation is injected back into said primary cavity through the second surface; and
    a signal modulating means in said secondary cavity for selectively enhancing a predetermined wavelength with respect to the other radiation wavelengths from within said range, whereby radiation injected into the primary cavity from the secondary cavity through said second surface is essentially of said predetermined wavelength, said signal modulating means being variable to effect rapid switching among alternative predetermined wavelengths from within said range.

2. The apparatus of claim 1 wherein:
    said signal modulating means includes an acousto-optic deflector, and a variable frequency drive means for determining the frequency in the acousto-optic deflector.

3. The apparatus of claim 2 wherein the variable frequency drive means is a an RF drive.

4. The apparatus of claim 3 wherein the acousto-optic deflector comprises a Bragg cell.

5. The apparatus of claim 1 wherein said signal modulating means includes first and second Bragg cells in series between said second surface and said third surface; said first Bragg cell positioned to increase the frequency of radiation traveling from the second surface to the third surface, and said second Bragg cell positioned to decrease the frequency of radiation traveling from the second surface to the third surface.

6. The apparatus of claim 1 wherein said gain tube is positioned between said first and second surfaces, and wherein said first path is a straight line.

7. The apparatus of claim 1 including means defining a fourth surface for partially reflecting and partially transmitting radiation, said fourth surface being in said primary optical cavity and cooperating with said first and second surfaces to reflect said radiation in a unidirectional ring, with said gain tube positioned along one leg of the ring between said first and fourth surfaces;
    means defining a fifth surface for reflecting radiation, located in said secondary optical cavity between said signal modulating means and said third surface; and means defining a sixth surface for reflecting radiation located in said secondary optical cavity between said signal modulating means and said second surface and positioned to inject radiation received from the signal modulating means through said second surface into said primary optical cavity.

8. The apparatus of claim 7 including a retro-reflector outside of said primary optical cavity and aligned with said gain tube and said fourth surface, and positioned to reflect radiation, transmitted through said fourth surface, back through the fourth surface to the gain tube.

9. The apparatus of claim 1 including tuning means for providing off-resonant tuning of radiation in said secondary cavity.

10. The apparatus of claim 9 wherein said tuning means includes a piezoelectric element supporting said third surface, and a piezoelectric drive for controlling the piezoelectric element.

11. The apparatus of claim 10 wherein said tuning means further includes a detector for receiving the $0^{th}$-order reflection from said third surface, a comparator for generating an output based upon a signal from said detector and a reference signal, and a controller generating an output to said piezoelectric element based on the input from said comparator, thereby to control the position of said third surface.

* * * * *